(12) United States Patent  (10) Patent No.: US 7,861,926 B2
Sheldon et al.  (45) Date of Patent: Jan. 4, 2011

(54) TRANSACTION CARD WITH MOVABLE MEMBER

(75) Inventors: David K. Sheldon, Loveland, OH (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 441 days.

(21) Appl. No.: 12/138,727

(22) Filed: Jun. 13, 2008

(65) Prior Publication Data

US 2009/0308919 A1 Dec. 17, 2009

(51) Int. Cl.
G06K 5/00 (2006.01)
(52) U.S. Cl. .................. 235/380; 235/487
(58) Field of Classification Search ............ 235/380, 235/487
See application file for complete search history.

(56) References Cited

U.S. PATENT DOCUMENTS

| | | | |
|---|---|---|---|
| 744,545 A | 11/1903 | Hervey | |
| 966,107 A | 8/1910 | Lowe | |
| 976,495 A | 11/1910 | Reeves | |
| 1,041,573 A | 10/1912 | Baring-Gould | |
| 1,064,576 A | 6/1913 | Washburn | |
| 1,333,686 A | 3/1920 | Spotswood | |
| 1,546,928 A | 7/1925 | Graham | |
| 1,618,710 A | 2/1927 | Hose | |
| 1,764,063 A | 6/1930 | Youngberg | |
| 1,784,364 A | 12/1930 | Von Der Lippe-Lipski | |
| 1,951,022 A | 3/1934 | Iverson | |
| 1,961,973 A | 6/1934 | Jenkins | |
| 2,476,742 A | 7/1949 | Lareau et al. | |
| 2,536,155 A | 1/1951 | Brand | |
| 2,545,804 A | 3/1951 | Butler | |
| 2,573,625 A | 10/1951 | Swart | |
| 2,728,167 A | 12/1955 | Knott | |
| 2,732,655 A | 1/1956 | Dirckx | |
| 2,787,852 A | 4/1957 | Youngren | |
| 2,834,123 A | 5/1958 | Knight | |
| 2,931,657 A | 4/1960 | Lewis | |
| 3,462,857 A | 8/1969 | Glass et al. | |
| 3,624,938 A | 12/1971 | Richard | |

(Continued)

OTHER PUBLICATIONS

"Mechanically Convertible Transaction Product", U.S. Appl. No. 11/753,854, filed May 25, 2007.

(Continued)

Primary Examiner—Michael G Lee
Assistant Examiner—Kristy A Haupt
(74) Attorney, Agent, or Firm—Griffiths & Seaton PLLC

(57) ABSTRACT

A transaction card includes a housing, a first roller, a second roller and a machine readable link. The first roller is rotatably coupled to and at least partially stored within the housing and has a first rotational axis. The second roller is rotatably coupled to and at least partially stored within the housing and has a second rotational axis. The second rotational axis differs from the first rotational axis. The machine readable link to an account or record is coupled with the housing. The account or record is configured to track an associated value available for application toward one of a purchase and a use of one or more of goods and services. Other cards, products, assemblies and methods of using such cards, products and assemblies are also disclosed.

25 Claims, 12 Drawing Sheets

U.S. PATENT DOCUMENTS

| | | | |
|---|---|---|---|
| 3,686,480 | A | 8/1972 | Bowerman |
| 3,717,942 | A | 2/1973 | Presby |
| 3,721,022 | A | 3/1973 | Mercorelli |
| 3,829,994 | A | 8/1974 | Dillon |
| 4,043,055 | A | 8/1977 | Zegel |
| 4,054,242 | A | 10/1977 | Strobe |
| 4,086,715 | A | 5/1978 | Blonigen |
| 4,100,689 | A | 7/1978 | Broune |
| 4,309,839 | A | 1/1982 | White et al. |
| 4,341,035 | A | 7/1982 | Jaworski et al. |
| 4,445,868 | A * | 5/1984 | Nuttal et al. ............ 434/88 |
| D304,044 | S | 10/1989 | Rudell et al. |
| 4,920,675 | A | 5/1990 | Mashimo |
| 4,958,455 | A | 9/1990 | Jacobsen |
| 5,152,090 | A | 10/1992 | Jacobsen |
| D351,196 | S * | 10/1994 | Baray .................. D21/478 |
| 5,669,165 | A | 9/1997 | Santorsola |
| 6,085,451 | A | 7/2000 | Riehle |
| 6,146,721 | A | 11/2000 | Freynet |
| 6,832,730 | B2 | 12/2004 | Conner et al. |
| 6,871,432 | B2 | 3/2005 | Lacroix |
| D510,595 | S | 10/2005 | Cook, Jr. |
| 7,264,155 | B2 | 9/2007 | Halbur et al. |
| 7,314,179 | B1 | 1/2008 | Halbur et al. |
| 7,316,357 | B2 | 1/2008 | Lindahl et al. |
| 7,360,710 | B2 | 4/2008 | Lindahl et al. |
| 2002/0096873 | A1 | 7/2002 | Scheinblum |
| 2002/0143697 | A1 | 10/2002 | Gotfried |
| 2004/0249748 | A1 | 12/2004 | Schultz et al. |
| 2005/0061889 | A1 | 3/2005 | McGee et al. |
| 2007/0241198 | A1 | 10/2007 | Halbur et al. |
| 2008/0083145 | A1 | 4/2008 | Wynalda, Jr. et al. |

OTHER PUBLICATIONS

"Transaction Product With Removable Articles", U.S. Appl. No. 11/843,844, filed Aug. 23, 2007.

"Transaction Product With Generator", U.S. Appl. No. 11/931,961, filed Oct. 31, 2007.

"Transaction Card With Movable Member", U.S. Appl. No. 11/965,474, filed Dec. 27, 2007.

"Cake Topper Transaction Product", U.S. Appl. No. 12/138,684, filed Jun. 13, 2008.

GiftCard with Rotating Pinwheel Offered for Sale at Target retail stores beginning Dec. 26, 2004 (2 pages).

Wade, Will, "First Data Sees Sticker Device as Mobile-Pay Bridge," American Banker, Aug. 25, 2008, 2 pages.

"Contactless Payments: Consumer Trends and Usage Preferences," firstdata.com, 2008, 2 pages.

"Payment Processing: Mobile Commerce and the M-Wallet: A Market Brief," Retail Solutions Online, May 10, 2007, 2 pages.

* cited by examiner

TRANSACTION CARD WITH MOVABLE MEMBER

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction card including a housing, a first roller, a second roller and a machine readable link. The first roller is rotatably coupled to and at least partially stored within the housing and has a first rotational axis. The second roller is rotatably coupled to and at least partially stored within the housing and has a second rotational axis. The second rotational axis differs from the first rotational axis. The machine readable link to an account or record is coupled with the housing. The account or record is configured to track an associated value available for application toward one of a purchase and a use of one or more of goods and services. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A gift card or other transaction card is adapted for making purchases of goods and/or services from e.g. a retail store or website. According to one embodiment, an original consumer buys the transaction card to give a recipient who in turn is able to use the transaction card at a retail store or setting to pay for goods and/or services. The transaction card, according to embodiments of the present invention, provides the consumer and recipient with extra amusement in addition to the ability to pay for goods and/or services with the transaction card.

In one example, the transaction card includes a plurality of multifaceted members each including at least two substantially planar surfaces. Each member is configured to depict different versions of a portion of a character or scene. More specifically, each surface of a member depicts a different version of the character or scene portion. For example, a first member depicts two separate versions of a head or head portion of a character while a second member depicts two separate versions of a body or body portion of the character.

Each member is configured to be rotated or otherwise moved to change which surface, and therefore, which depicted version of the corresponding character portion is presented to the bearer of the transaction card. As such, a bearer can rotate or move each member to change the overall appearance of the character as presented to the card bearer. For example, the first member can be moved to present either one of a first or second surface to the bearer. A different head portion is presented to the user as part of the character depending upon which of the two surfaces is presented. Such non-transactional use of the transaction card amuses the bearer of the transaction card as well as any other observers of the transaction card. In one embodiment, the non-transactional and amusing features of the transaction card promote the sale and/or loading of the transaction card by potential consumers and/or bearers of the transaction card.

Figure 1:
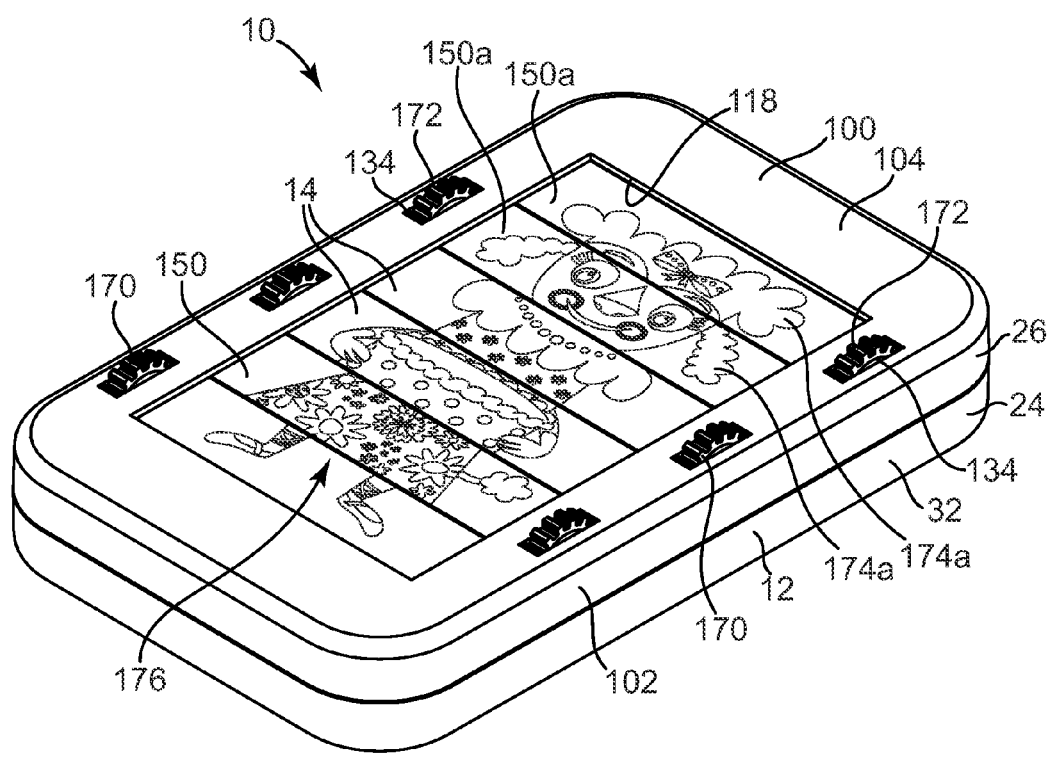
FIG. 1 is a perspective view illustration of a transaction card in a first configuration, according to one embodiment of the present invention.
Figure 2:
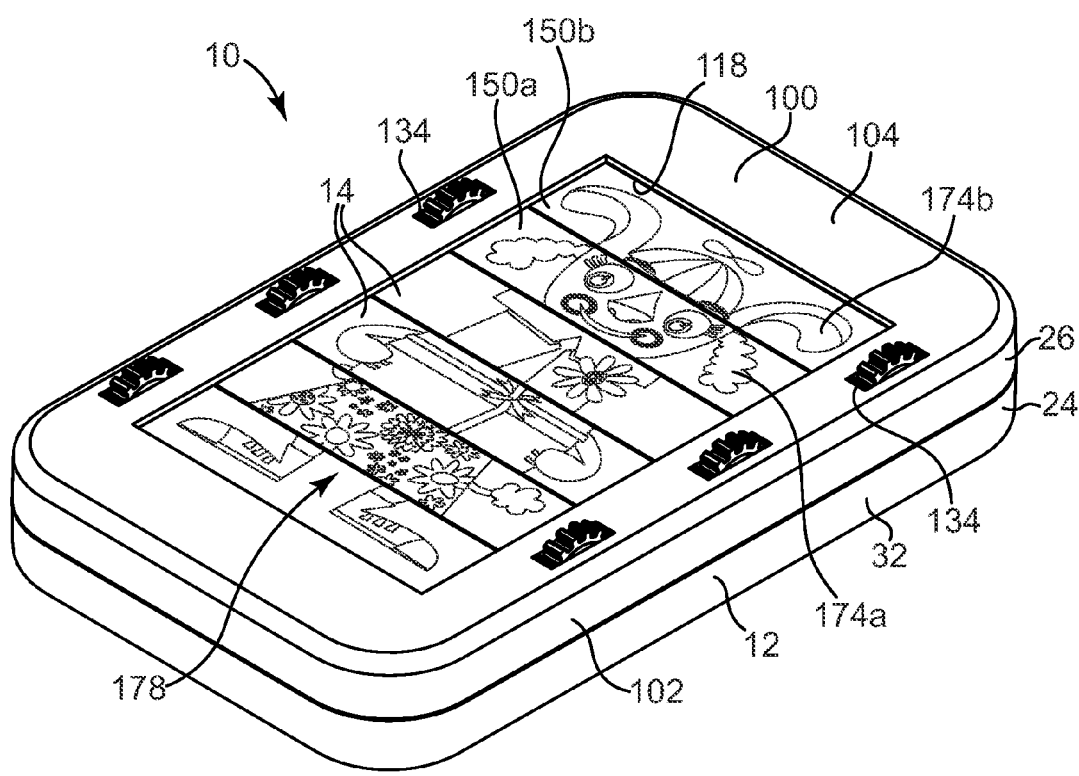
FIG. 2 is a perspective view illustration of the transaction card of FIG. 1 in a second configuration, according to one embodiment of the present invention.
Figure 3:
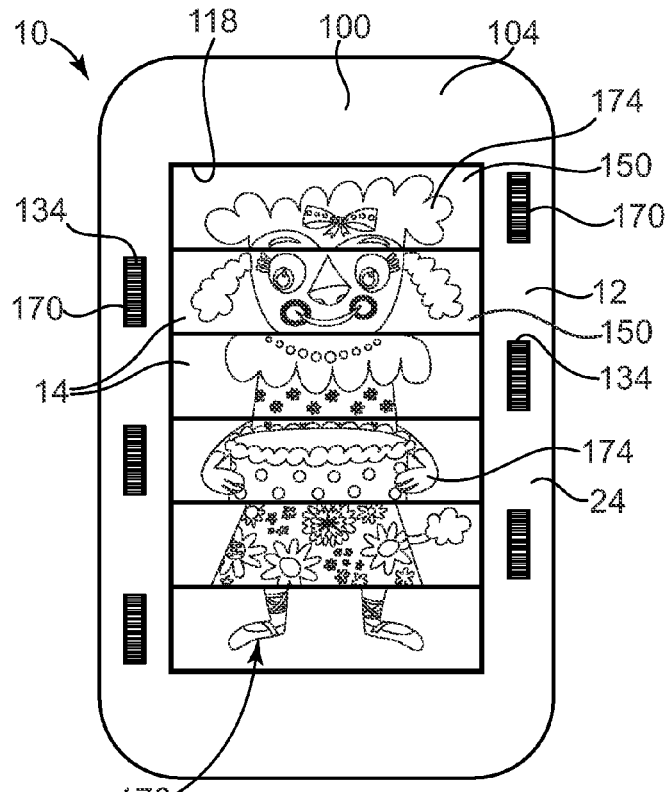
FIG. 3 is a front view illustration of the transaction card of FIG. 1, according to one embodiment of the present invention.

Turning to the figures, FIGS. 1-7 illustrate one embodiment of a transaction card 10 such as a stored-value product (e.g., gift card, phone card, etc.), credit product, etc. according to the present invention. Transaction card 10 is configured to be used toward the purchase and/or use of goods and/or services and includes a support member or housing 12 and at least one movable member 14 (e.g., a roller or other auxiliary member) at least partially stored therein. Each member 14 includes multiple surfaces each depicting a different version of a similar portion of a character, scene, textual presentation or other overall image or visual presentation. Member(s) 14 are independently movable to mix and match the depicted versions presented to the card bearer thereby changing the appearance of the overall image. For example, when members 14 are each in a first position, a first character is depicted and presented to the card bearer as indicated in FIG. 1. Movement of one or more of members 14 changes the character portion depicted by the corresponding one or more members 14 to change the overall image as shown in FIG. 2.

Transaction card 10 includes an account identifier 20 (FIG. 4) such as a barcode, magnetic strip, a smart chip or other electronic device, a radio frequency identification (RFID) device or other suitable machine readable link. Account identifier 20 indicates an account or record to which transaction card 10 is linked. The account or record of the monetary or other balance on transaction card 10 optionally is maintained on a database, other electronic or manual record-keeping system or, in the case of "smart" cards for example, on a chip or other electronics or devices on transaction card 10 itself. Accordingly, by scanning account identifier 20, the account or record linked to transaction card 10 is identified and can subsequently be activated, have amounts debited therefrom and/or have amounts added thereto.

In one embodiment, account identifier 20 includes a character string or code 22 (e.g., a number and/or letter string) configured to provide additional security to transaction card 10 and/or configured to be read by a bearer of transaction card 10 to facilitate use of transaction card 10 for web site or other purchases outside of a brick-and-mortar type retail establishment. With the above in mind, account identifier 20 is one example of means for linking transaction card 10 with an account or record, and a scanner capable of reading account identifier 20 is one example of means for activating or loading value on transaction card 10.

In one embodiment, housing 12 includes a first housing member 24 and a second housing member 26. In one embodiment, first housing member 24 is a base, and second housing member 26 is a cover. In one embodiment of base 24, as described with reference to FIGS. 4 and 7, base 24 includes a primary panel 30 and a side wall 32. Primary panel 30 is generally planar and defines an outside surface 34 (FIG. 4) and an inside surface 36 (FIGS. 7 and 10) opposite outside surface 34. In one embodiment, primary panel 30 is generally rectangular and sized similar to an identification card, a credit card or other card sized to fit in a wallet of a user. In other embodiments, primary panel 30 is otherwise shaped as a square, circle, oval, star or any other suitable shape.

Figure 4:
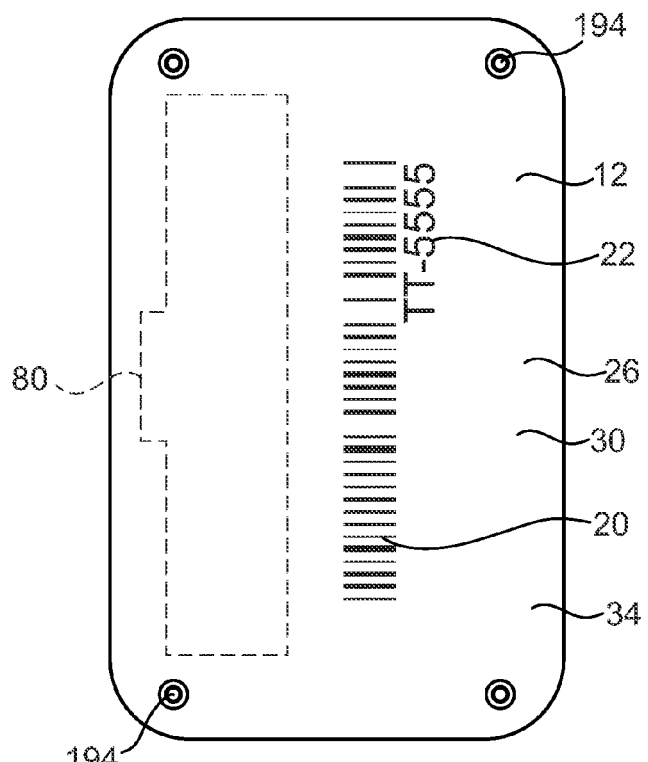
FIG. 4 is a rear view illustration of the transaction card of FIG. 1, according to one embodiment of the present invention.
Figure 5:
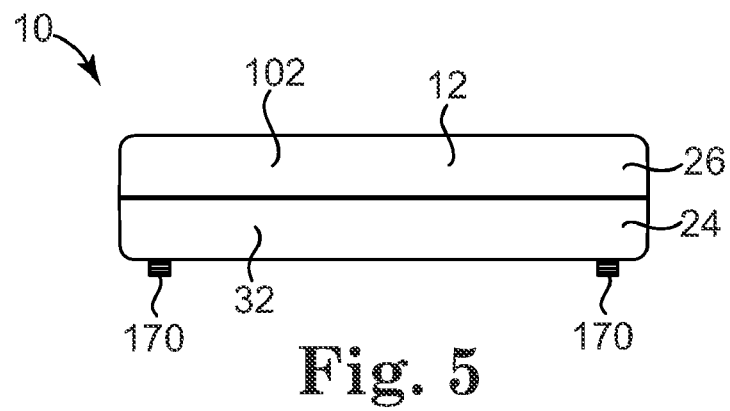
FIG. 5 is a top view illustration of the transaction card of FIG. 1, according to one embodiment of the present invention, wherein the bottom view is a mirror image thereof.
Figure 6:
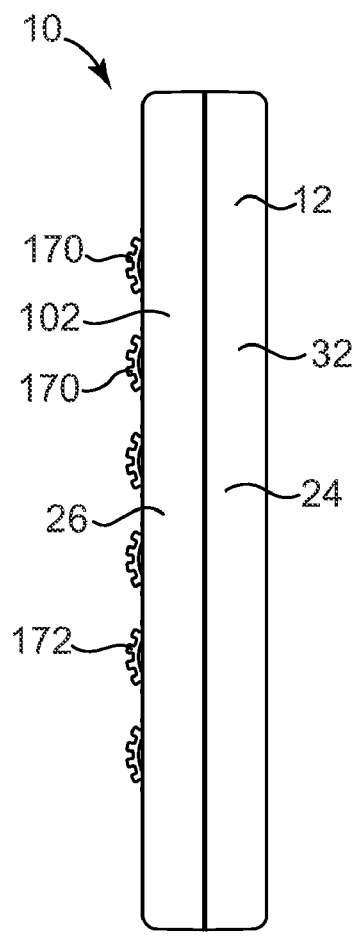
FIG. 6 is a right side view illustration of the transaction card of FIG. 1, according to one embodiment of the present invention, wherein the left side view is a mirror image thereof.
Figure 7:
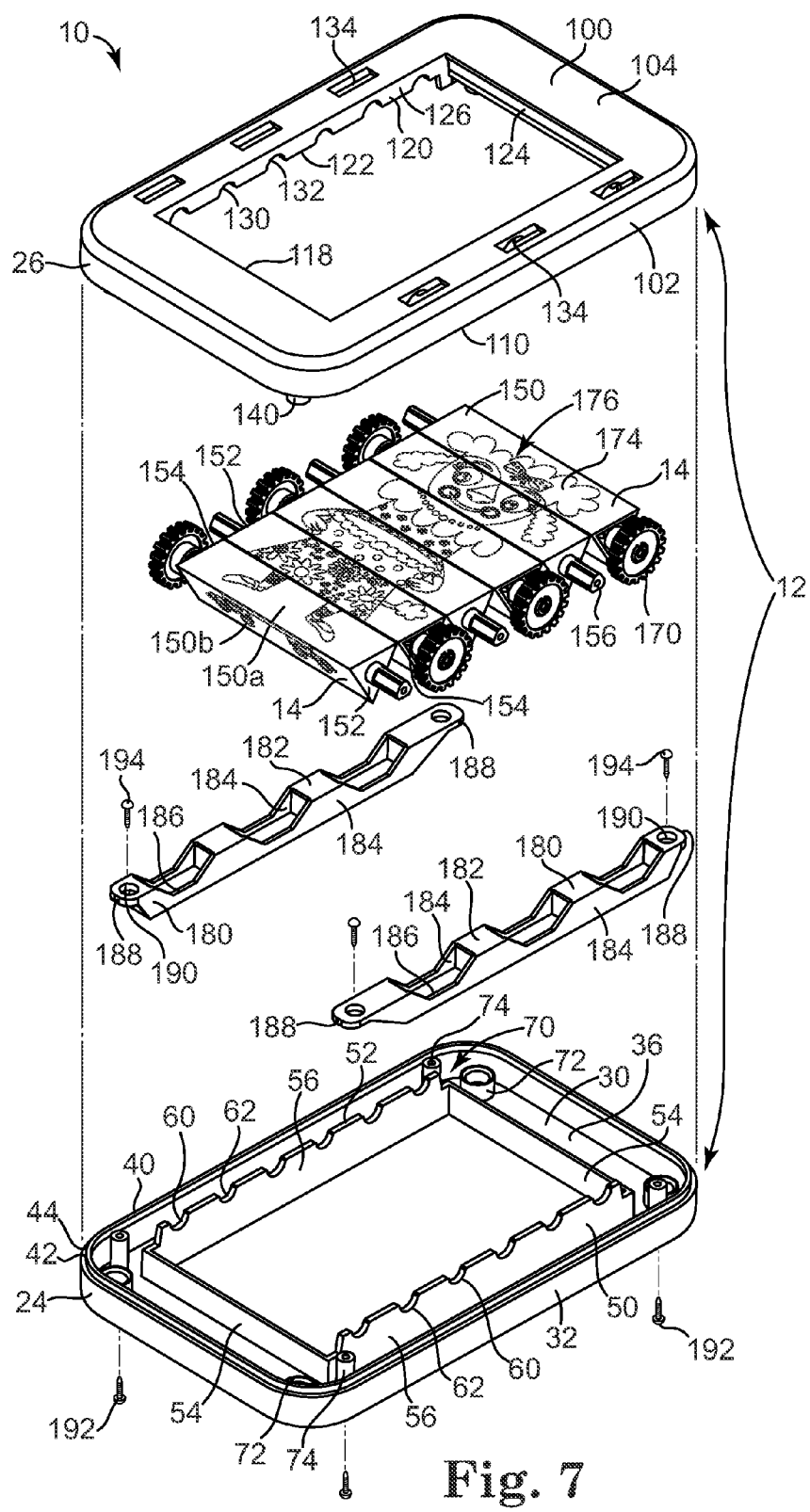
FIG. 7 is an exploded, perspective view illustration of the transaction card of FIG. 1, according to one embodiment of the present invention.

Primarily referring to FIGS. 4 and 7, side wall 32 extends from inside surface 36 away from outside surface 34 and substantially about the entire perimeter of primary panel 30. In one embodiment, side wall 32 extends with a substantially perpendicular orientation relative to primary panel 30. Side wall 32 extends from primary panel 30 to collectively define an inside edge 40 opposite primary panel 30. In one example, inside edge 40 is formed as a stepped edge including a first portion 42 and a second portion 44. First portion 42 extends from primary panel 30 a smaller distance than second portion 44 extends from primary panel 30. In one example, first portion 42 extends generally about the perimeter of second portion 44. In this respect, inside edge 40 is formed as a stepped edge with the higher, second portion 44 being positioned just inside lower, first portion 42.

In one example, primary panel 30 defines a flange 50 extending from inside surface 36 of primary panel 30 in a direction substantially parallel to side wall 32 to define an inside edge 52 opposite primary panel 30. In one example, flange 50 is substantially rectangular and defines two lateral flange segments 54 positioned opposite one another and two longitudinal flange segments 56 positioned opposite one another and extending between the two lateral flange segments 54. Notably, as used herein the terms "lateral" and "longitudinal" are generally used to describe two directions or orientations that are substantially perpendicular to one another. In one embodiment, rather than a continuous flange 50 defining a rectangle, flange segments 54 and 56 are discretely formed individually and do not necessarily connect to all or any other of flange segments 54 and 56 as will be apparent to one of skill in the art upon reading the present application.

In one embodiment, each of the longitudinal flange segments 56 defines a plurality of cutouts 60 extending from inside edge 52 toward primary panel 30. In one example, each cutout 60 has a substantially curvilinear end 62 (FIG. 7) opposite inside edge 52. In one embodiment, the number of the plurality of cutouts 60 defined by each longitudinal flange segment 56 is equal to the number of members 14 included in transaction card 10. In one example, the plurality of cutouts 60 of one of longitudinal flange segments 56 are longitudinally spaced from one another in a manner mirroring the positioning and spacing of the plurality of cutouts 60 defined by the other of longitudinal flange segments 56.

In one embodiment, connection or alignment features 70 protrude from inside surface 36 of primary panel 30 in a direction substantially parallel to side wall 32. In one example, each alignment feature 70 is at least partially hollow so as to receive a corresponding feature of another component of transaction card 10, as will be further described below, for example, to facilitate alignment and coupling of base 24 with cover 26 or other corresponding feature of transaction card 10. In one embodiment, alignment features 70 include a first plurality of alignment features 72 configured to receive corresponding features of cover 26 and a second plurality of alignment features 74 (FIG. 7) configured to receive internal components of transaction card 10 as will be further described below. In one example, each of the first plurality of alignment features 72 is positioned near a different corner defined by primary panel 30. In one example, the second plurality of alignment features 74 are laterally positioned between one of longitudinal flange segments 56 of flange 50 and a portion of side wall 32 nearest to the corresponding longitudinal flange segment 56. Other features configured to facilitate alignment and coupling of base 24 and cover 26 are also contemplated.

In one embodiment, redemption indicia 80, which are generally indicated by a broken line box in FIG. 4, are included on housing 12, for example, on outside surface 34 of base 24. Redemption indicia 80 indicate that transaction card 10 is redeemable for the purchase of goods and/or services and that, upon use, a value of the purchased goods and/or services will be deducted from the financial account or record linked to transaction card 10. In one embodiment, redemption indicia 80 include phrases such as "<NAME OF STORE> GiftCard" and "This GiftCard is redeemable for merchandise or services at any of our stores or at our web site," and/or provides help or phone line information in case of a lost, stolen or damaged stored-value card, etc. In one embodiment, redemption indicia 80 are additionally or alternatively included on cover 26 of housing 12.

Figure 8:
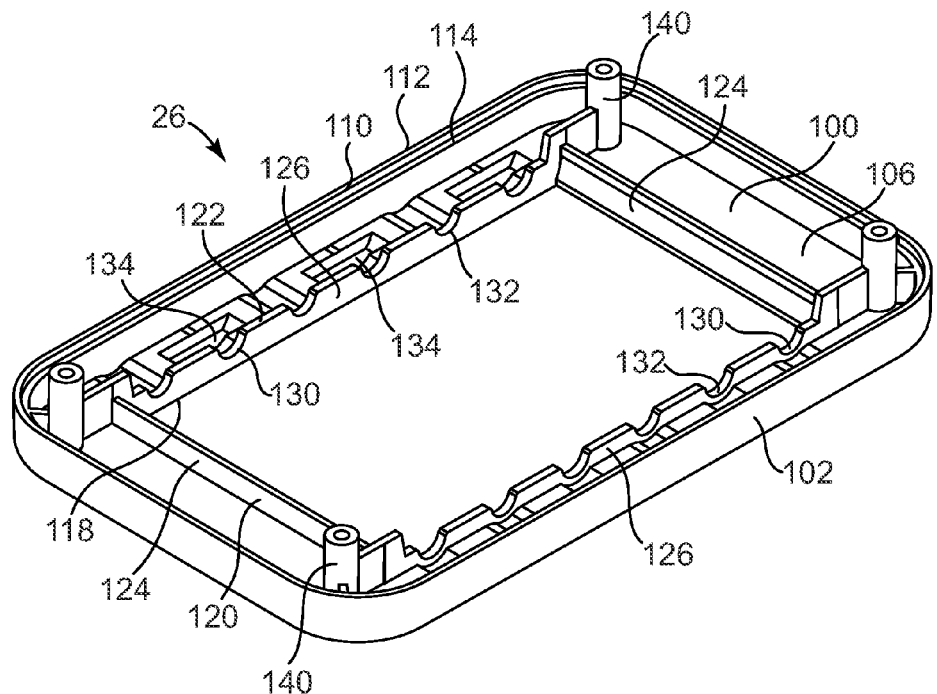
FIG. 8 is a perspective inside view illustration of a cover of the transaction card of FIG. 1, according to one embodiment of the present invention.

One embodiment of cover 26 is illustrated with reference to FIGS. 7 and 8. Cover 26 generally includes a primary panel 100 and a side wall 102. Primary panel 100 is generally planar and defines an outside surface 104 and an inside surface 106 (FIG. 8) opposite outside surface 104. In one embodiment, primary panel 100 is substantially sized similarly to primary panel 30 of base 24. Side wall 102 extends from inside surface 106 away from outside surface 104 and generally about the entire perimeter of primary panel 100. For example, side wall 102 extends with a substantially perpendicular orientation relative to primary panel 100.

Side wall 102 extends from primary panel 100 to form an inside edge 110 opposite primary panel 100. In one embodiment, inside edge 110 is a stepped edge including a first portion 112 and a second portion 114. In one embodiment, first portion 112 extends from primary panel 100 a further distance than second portion 114 extends from primary panel 100. First portion 112 extends around the perimeter of second portion 114. In this respect, inside edge 110 is formed as a stepped edge with lower, second portion 114 being positioned just inside higher, first portion 112.

In one example, primary panel 30 defines a window 118 sized to reveal at least a portion of each member 14 upon assembly of transaction card 10. Referring to FIGS. 7 and 8, in one embodiment, cover 26 defines a flange 120 extending from inside surface 106 of primary panel 100 in a direction substantially parallel to side wall 102 and substantially around a perimeter of window 118. In this manner, flange 120 defines an inside edge 122 opposite primary panel 100. In one example, where flange 120 is substantially rectangular and defines two lateral flange segments 124 positioned opposite one another and two longitudinal flange segments 126 positioned opposite one another and extending between the two lateral flange segments 124. In one embodiment, rather than a continuous flange 120 defining a rectangle, flange segments 124 and 126 are discretely formed and do not necessarily connect to all or any other of flange segments 124 and 126 as will be apparent to one of skill in the art upon reading the present application.

In one embodiment, each of the longitudinal flange segments 126 defines a plurality of cutouts 130 extending from inside edge 122 toward primary panel 100. In one example, each cutout 130 has a substantially curvilinear end 132 opposite inside edge 122. In one embodiment, the number of the plurality of cutouts 130 defined by each longitudinal flange segment 126 is equal to the number of members 14 included in transaction card 10. In one example, the plurality of cutouts 130 of one of longitudinal flange segments 126 are longitudinally spaced from one another in a manner laterally mirroring the positioning and spacing of the plurality of cutouts 130 defined by the other of longitudinal flange segments 126. In one embodiment, each cutout 130 is configured to be laterally and longitudinally spaced and positioned to align with each cutout 60 of base 24 upon assembly of transaction card 10.

In one embodiment, one or more apertures 134 are defined by and extend through primary panel 100. Each aperture 134 is laterally adjacent and longitudinally positioned to be centered with one of cutouts 130 and is defined between one of longitudinal flange segments 126 and the nearest longitudinal segment of side wall 102. As such, each aperture 134 is spaced and formed separately from window 118. In one example, each aperture 134 is substantially rectangular and elongated in the longitudinal direction. In one embodiment, apertures 134 positioned on a first side of flange 120 (i.e., adjacent a first longitudinal flange segment 126) correspond with every other cutout 130 formed in that longitudinal flange segment 126 (e.g., only half of cutouts 130 have a corresponding aperture 134), and apertures 134 formed on a second or opposite side of flange 120 (i.e., adjacent second longitudinal flange segment 126) correspond with every other cutout 130 formed in that longitudinal flange segment 126. In one example, the apertures 134 defined on a first side of flange 120 are staggered with respect to the apertures 134 defined on a second side of flange 120.

In one example, cover 26 includes a plurality of alignment features 140 (e.g., cylindrical protrusions, etc.) extending from inside surface 106 parallel to side wall 102. At least a portion of the plurality of alignment features 140 are positioned on cover 26 to substantially align with at least a portion of alignment features 70 of base 24 (FIG. 7), for example, the first plurality of alignment features 72 of base 24, to facilitate alignment and coupling of base 24 with cover 26. In one embodiment, each the plurality of alignment features 140 is hollow and, in some examples, defines a threaded internal cavity as will be further described below.

In one embodiment, each of base 24 and cover 26 is formed by injection molding of plastic (e.g. polycarbonate, polystyrene, polyvinyl chloride (PVC), acrylonitrile butadiene styrene (ABS), polyethylene terephthalate (PET), teslin, polypropylene (PP), polylactide (PLA) and acrylic) or other suitable material to define the various attributes of base 24 and cover 26. Each of base 24 and 26 may be formed as a single piece material or as a component of multiple pieces. Other methods of forming base 24 and cover 26 are also contemplated. In one embodiment, in which base 24 is formed by injection molding, account identifier 20, redemption indicia 80 and any other indicia or information are printed onto outside surface 34 of the injection molded base 24.

Figure 9:
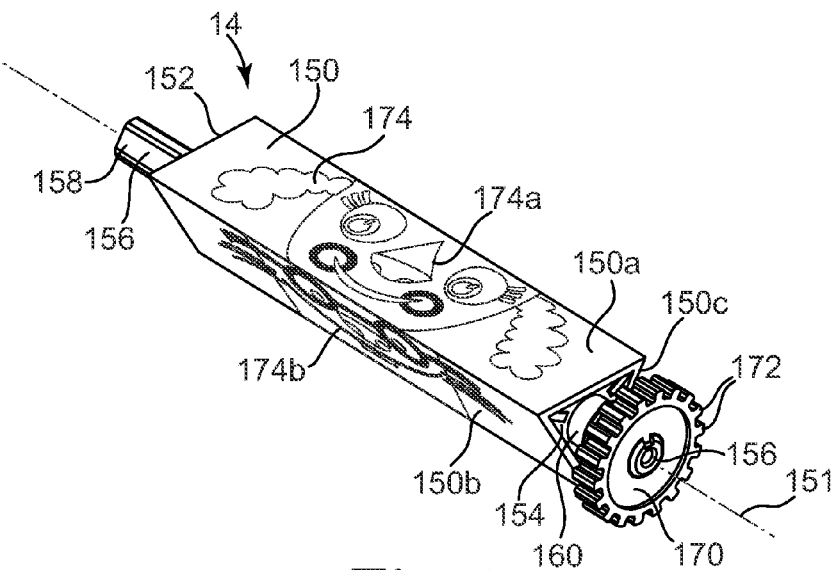
FIG. 9 is a perspective view illustration of a movable member of the transaction card of FIG. 1, according to one embodiment of the present invention.

Referring to FIG. 9, each member 14 defines two or more sides or planar surfaces 150, for example, three surfaces 150a, 150b and 150c, which are similarly sized and shaped to with respect to one another. Each surface 150 extends parallel to a rotational axis 151 of the corresponding member 14 and, in one embodiment, terminates at a first end 152 of the corresponding member 14 and a second end 154 of the corresponding member 14 opposite the first end 152. As such, each member 14 is similar to a roller or spindle having a triangular, rectangular, pentagonal or other polygonal transverse cross-sectional shape (for example, each member 14 is a regular triangular prism, a regular pentagonal prism, a regular rectangular prism or any other suitable regular polygonal prism) For example, where only three surfaces 150a, 150b and 150c are defined, member 14 has a substantially triangular cross-sectional shape, each end 152 and 154 is substantially triangular in shape and is positioned to extend substantially perpendicular to each surface 150a, 150b and 150c. In one embodiment, a lateral centerline of each surface 150a, 150b and 150c is positioned a similar radial distance from and extend parallel to rotational axis 151 (FIG. 9) of the corresponding member 14.

In one embodiment, an axle 156 is coupled to each member 14 and extends through a corresponding rotational axis 151 thereof and beyond each end 152 and 154 to define a first axle portion 158 and a second axle portion 160. In one example, axle 156 is continuous and extends through member 14, while in one example, axle 156 only extends from each end 152 and 154 outward (i.e., away from the other of end 152 and 154) to respectively form first axle portion 158 and second axle portion 160. Axle 156 may be of any suitable shape configured to facilitate rotation of member 14 between positions as will be further described below. In one example, axle 156 is substantially cylindrical. In one example, axle 156 has a substantially triangular cross sectional shape with rounded corners to facilitate rotation of axle 156.

In one embodiment, a wheel or dial 170 or other actuator is coupled to and extends radially outwardly from second axle portion 160. Dial 170 provides a card bearer interface configured to facilitate contact and manipulation of member 14 by the card bearer. In one example, dial 170 is substantially circular and defines teeth 172 extending radially outwardly from a remainder of dial 170. Teeth 172 facilitate friction and grip between the bearer and member 14 such that the bearer will more easily be able to manipulate (e.g., rotate) dial 170 and, therefore, member 14 relative to housing 12. Notably, member 14, axle 156 and dial 170 may be integrally formed or formed of separate pieces coupled to one another in any suitable manner.

Each member 14 includes depictions 174 of a different portion of a character 176 (e.g., FIG. 1), scene or other overall image collectively depicted by the plurality of members 14. For example, as illustrated in FIG. 1, a character 176 is defined partially by each of six members 14. As such, character 176 is divided into six portions, for example, a first head portion, a second head portion, a first body portion, a second body portion, a first leg portion and a second leg portion. Each member 14 includes multiple depicted versions 174 of one of the six portions. More specifically, surfaces 150 defined by a single member 14 depicts two or more depicted versions 174, for example, three depicted versions as illustrated, for the corresponding portion of character 176 with each surface 150a and 150b depicting a different depicted version 174. For instance, member 14 as illustrated in FIG. 9 depicts three different versions 174 of a second head portion generally indicated as including depiction versions 174a and 174b. In view of the above, members 14 with depicted versions 174 are examples of means for depicting a portion of an image presentation.

As illustrated with reference to FIGS. 7-10, during assembly, the one or more members 14 are positioned within housing 12. More specifically, in one embodiment, each member 14 is placed relative to base 24 such that each first and second axle portions 158 and 160 of a corresponding axle 156 is placed in one of cutouts 60. In particular, first axle portion 158 of a member 14 is placed in a first one of cutouts 60, and second axle portion 160 of member 14 is placed in a second one of cutouts 60 that is longitudinally aligned with and laterally spaced from the first one of cutouts 60. As such, each member 14 laterally extends with respect to base 24 and is configured to rotate about its own rotational axis 151, which differs from the rotational axis 151 of other members 14.

Figure 10:
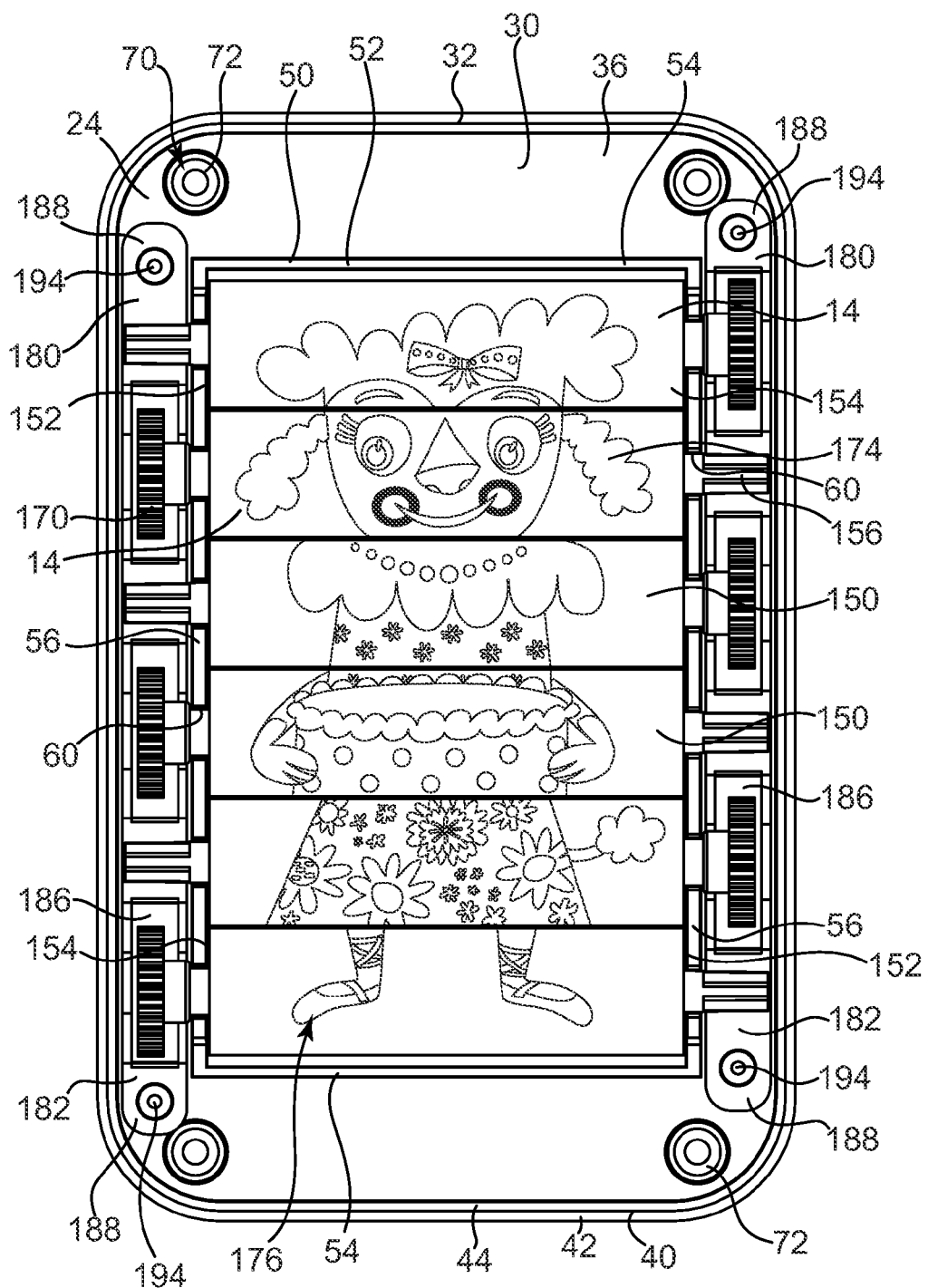
FIG. 10 is a partially assembled view of the transaction card of FIG. 1, according to one embodiment of the present invention.

In one example, two or more members 14 are included and are placed longitudinally adjacent one another such that the laterally extending rotational axes 151 of members 14 are positioned to be coplanar with and longitudinally spaced from one another. In one embodiment, members 14 are positioned in base 24 in a manner alternating which side of window 118 dial 170 is positioned. For example, dial 170 of a first member 14 is positioned on a right side of window 118 and dial 170 of a second member 14 adjacent the first member 14 is positioned on a left side of window 118 as illustrated in FIG. 10. Once positioned in cutouts 60, each member 14 is supported by flange 50 and configured to rotate about its axis 151. More specifically, in one embodiment, each member 14 is allowed to rotate generally without impediment such that each member 14 can rotate at least one full revolution (e.g., at least 360°) about the corresponding rotational axis 151. As such, members 14 are rotatable to bring the different surfaces 150 of the plurality of members 14 into a common front plane exhibiting character 176 or other image.

In one embodiment, transaction card 10 includes two cam members or cam plates 180 configured to facilitate secure placement of members 14 in housing 12. More specifically, in one embodiment, one of cam plates 180 is positioned within base 24 between longitudinal flange segment 56 and the nearest longitudinal segment of side wall 32 prior to placement of members 14 therein. Each cam plate 180 defines a front surface 182, which is positioned substantially parallel to primary panel 30, and side walls 184 extending from longitudinal edges of front surface 182 toward primary panel 30. Front surface 182 is closer to primary panel 30 than inside edge 52 of flange 50. Front surface 182 is configured to contact first axle portions 158 to further support each member 14 and to decrease any undesirable wobbling or other undesirable movement of members 14 within housing 12. In one example, each axle portion 158 and 160 has a similar transverse cross-sectional shape as member 14 (e.g., one of a triangular, rectangular or other suitable shape) but with rounded corners. In this manner, when relatively flat surfaces of axle portions 158 and 160 contact front surface 182, members 14 are likely to stay in a corresponding position without further card bearer interaction with transaction card 10. This bias is desirable as it tends to maintain members 14 in housing 12 such that one of surfaces 150 is directed toward the front of transaction card 10 rather than an intersecting edge of surfaces 150, which lends to a more aesthetically pleasing presentation.

To accommodate dials 170, in one example, cam plate 180 defines wells 186, which extend from and through front surface 182 toward primary panel 30. Each well 186 is sized and positioned to receive one dial 170 such that movement of dial 170 is not impeded by cam plate 180.

In one example, each cam plate 180 defines an aperture 190 at each opposing end 188 thereof. Cam plate 180 is secured to base by using a connection device 194 extending through aperture 190 and into one of the second plurality of alignment features 74 if base 24, which may be internally threaded to securely receive the corresponding connection device 194. In one embodiment, cam plate 180 is additionally or alternatively secured to base 24 with ultrasonic welding, adhesive and or other suitable method or material.

Once members 14 and/or cam plates 180 are each properly positioned, cover 26 is placed upon base 24 or vice versa. Accordingly, cover 26 is placed on base 24 such that inside edge 40 of base 24 interfaces with inside edge 110 of cover 26. More specifically, first portion 42 and second portion 44 of inside edge 40 interface with first portion 112 and second portion 114 of inside edge 110, respectively. The stepped interface provides for a stable and generally neat coupling of base 24 and cover 26. In one example, adhesive is applied between inside edge 40 and inside edge 110 to secure base 24 to cover 26 and/or cover 26 is ultrasonically welded or otherwise coupled with base 24 along inside edges 40 and 110. In one embodiment, upon coupling of base 24 with cover 26, alignment features 72 of base 24 each receive one of the plurality of alignment features 140 (FIG. 7) of cover 26. In one example, base 24 and cover 26 are alternatively or additionally secured to one another with connection devices 192 thread from outside surface 34 of primary panel 30 through alignment features 72 of base 24 and into internally threaded alignment features 140 of cover 26. Other methods of securing base 24 to cover 26 are also contemplated.

When aligned and/or coupled to one another, cover 26 is positioned over base 24 such that at least a portion of each member 14 is viewable to card bearer through window 118 of cover 26 while axle portions 158 and 160 and parts of each member 14 are hidden from a card bearer's view by housing 12. As such, housing 12 or at least portions thereof are examples of means for shielding members 14, more specifically, means for shielding all but one of depicted versions 174 of each member 14 from the card bearer's view.

Each dial 170 at least partially extends from inside housing 12 out beyond outside surface 104 of cover 26 through a corresponding aperture 134. Each aperture 134 is sized so as not to impede rotation or other desired movement of dial 170. In one embodiment, cover 26 substantially hides first and second ends 152 and 154 and first and second axle portions 158 and 160 from the view of a bearer of transaction card 10. In addition, when base 24 is coupled to cover 26, in one embodiment, flange 120 fits down around members 14 such that first and second axle portions 158 and 160 are at least partially received by cutouts 130 defined by flange 120, which further hides first and second axle portions 158 and 160 from view.

Upon assembly, transaction card 10 functions to both amuse consumers and/or recipients and to entice consumers to purchase transaction card 10. In particular, upon card bearer interaction with dials 170, corresponding ones of members 14 are rotated to position a different one of surfaces 150a, 150b and 150c of the corresponding member 14 to face a front of transaction card 10 to be viewed by the card bearer. Depending upon which surface 150a, 150b or 150c is presented toward the front of transaction card 10, a different version of the character portion is presented to the card bearer. In view of the above, dials 170 are examples of means for altering which of a plurality of depicted versions 174 of a corresponding member 14 are shielded from view and which are generally visible to the card bearer.

When each member 14 is rotated to have a surface 150 toward the front of transaction card 10, such surfaces 150 are positioned to be coplanar with one another and to be coplanar or otherwise parallel to outside surface 104 of primary panel 100 of cover 26. Rotation of each member 14, which is actuated by card bearer interaction with a corresponding dial 170, occurs about an axis 151 in a parallel plane with primary panel 100 and changes which surface 150a, 150b or 150c is viewable by the card bearer. Accordingly, rotation of each member 14, changes which depicted version 174 is viewable by card bearer, which, in turn, alters the overall character 176 or 178 or other overall image as viewed by the card bearer.

For example, as illustrated in FIG. 1, surface 150a including depicted version 174a of each member 14 is facing forward (i.e., is viewable through window 118) coplanar with one another. Upon card bearer interaction with selective ones of dials 170, various members 14 are rotated placing another surface, for example, surface 150b including depicted version 174b forward as illustrated in FIG. 2 merely by rotating one or more members 14. As such, first overall character 176 as defined in FIG. 1 is altered to become the second overall character 178 in FIG. 2. Additional rotation of members 14 actuated by card bearer interaction with dials 170 will create additional characters (not illustrated) by mixing and matching various depicted versions 174 provided by members 14 as will be apparent to those of skill in the art upon reading the present application.

Figure 11:
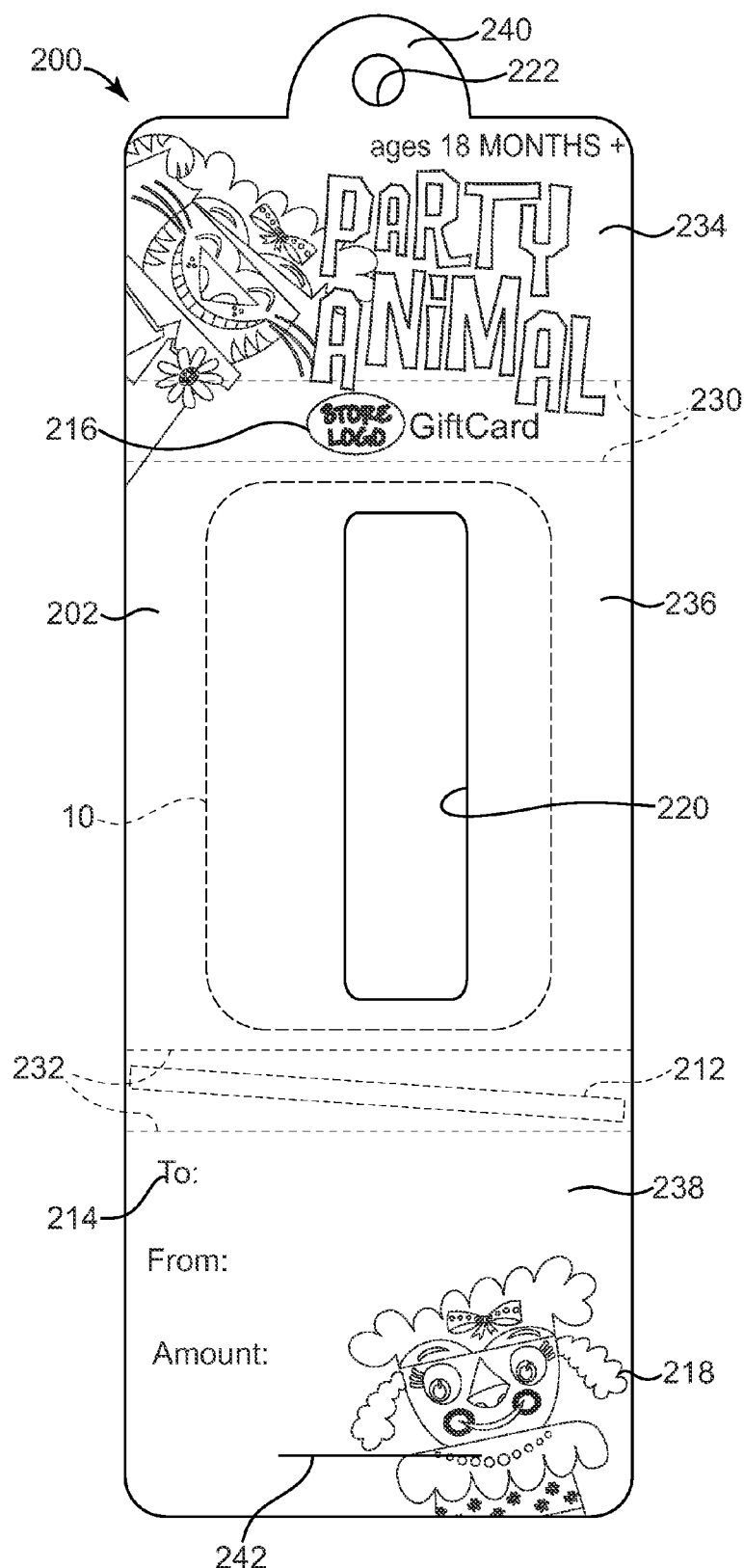
FIG. 11 is a front view of an unfolded carrier for a transaction card, according to one embodiment of the present invention.
Figure 12:
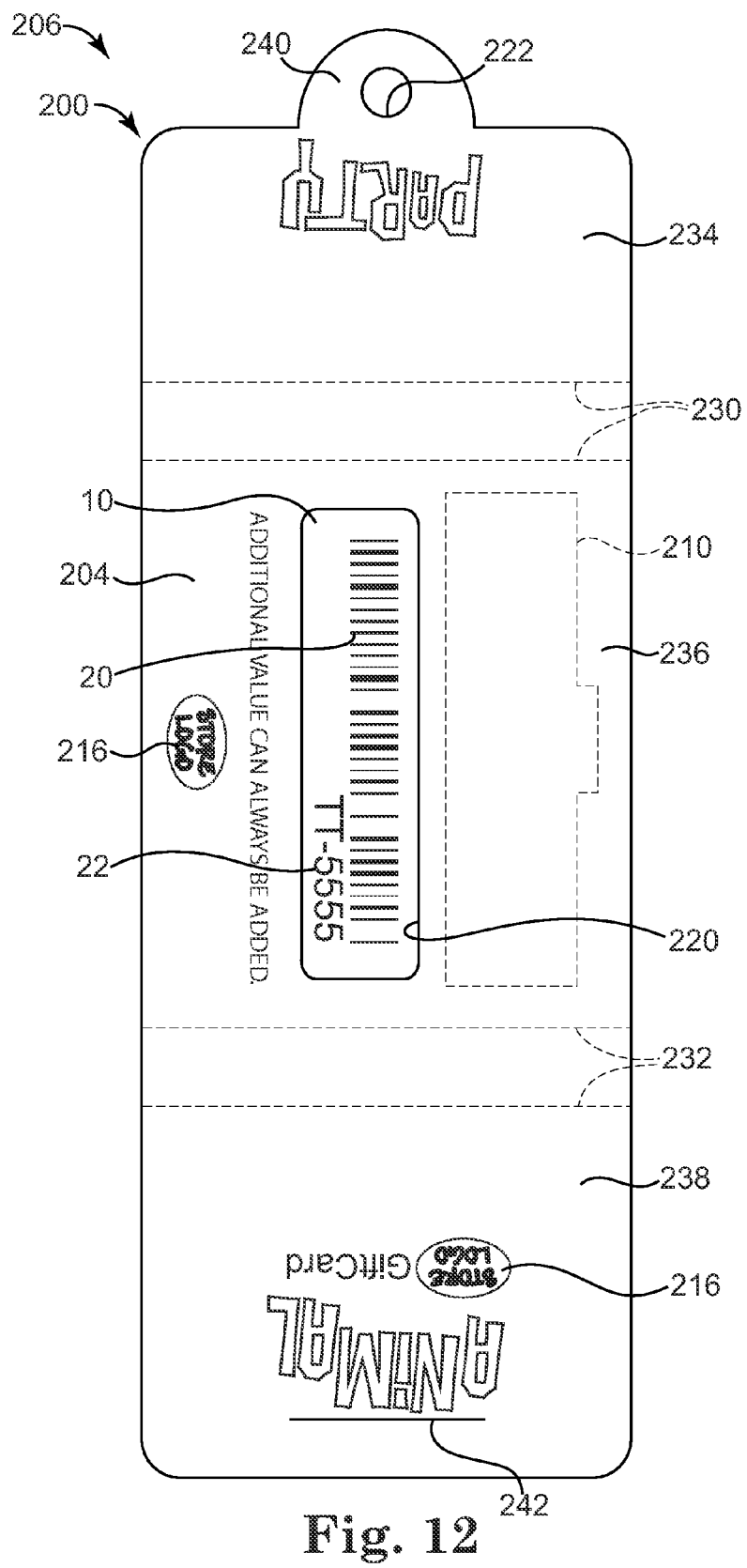
FIG. 12 is a back view of a transaction card assembly including the unfolded carrier of FIG. 11 with the transaction card of FIG. 1.

FIGS. 11 and 12 illustrate a carrier or backer 200 supporting transaction card 10 (FIGS. 1-7). Backer 200 comprises a single layer or multiple layers of paper or plastic material, for example, generally in the form of a relatively stiff but bendable/flexible card. Use of other materials to form backer 200 is also contemplated. Backer 200 defines a first or front surface 202 (FIG. 11) and a second or rear surface 204 (FIG. 12). Transaction card 10, which is generally represented in broken lines in FIG. 11 for illustrative purposes (e.g., to allow for full viewing of front surface 202), is readily releasably attached to backer 200, for example, by adhesive, blister packaging, overlying skinning material, clam shell packaging or the like, such that transaction card 10 and backer 200 collectively define a transaction card assembly 206.

In one embodiment, backer 200 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 202 and 204. In one example, the indicia include one or more of redemption indicia 210, instructional indicia 212, message field indicia 214, brand indicia 216, decorative indicia 218, etc.

Figure 13:
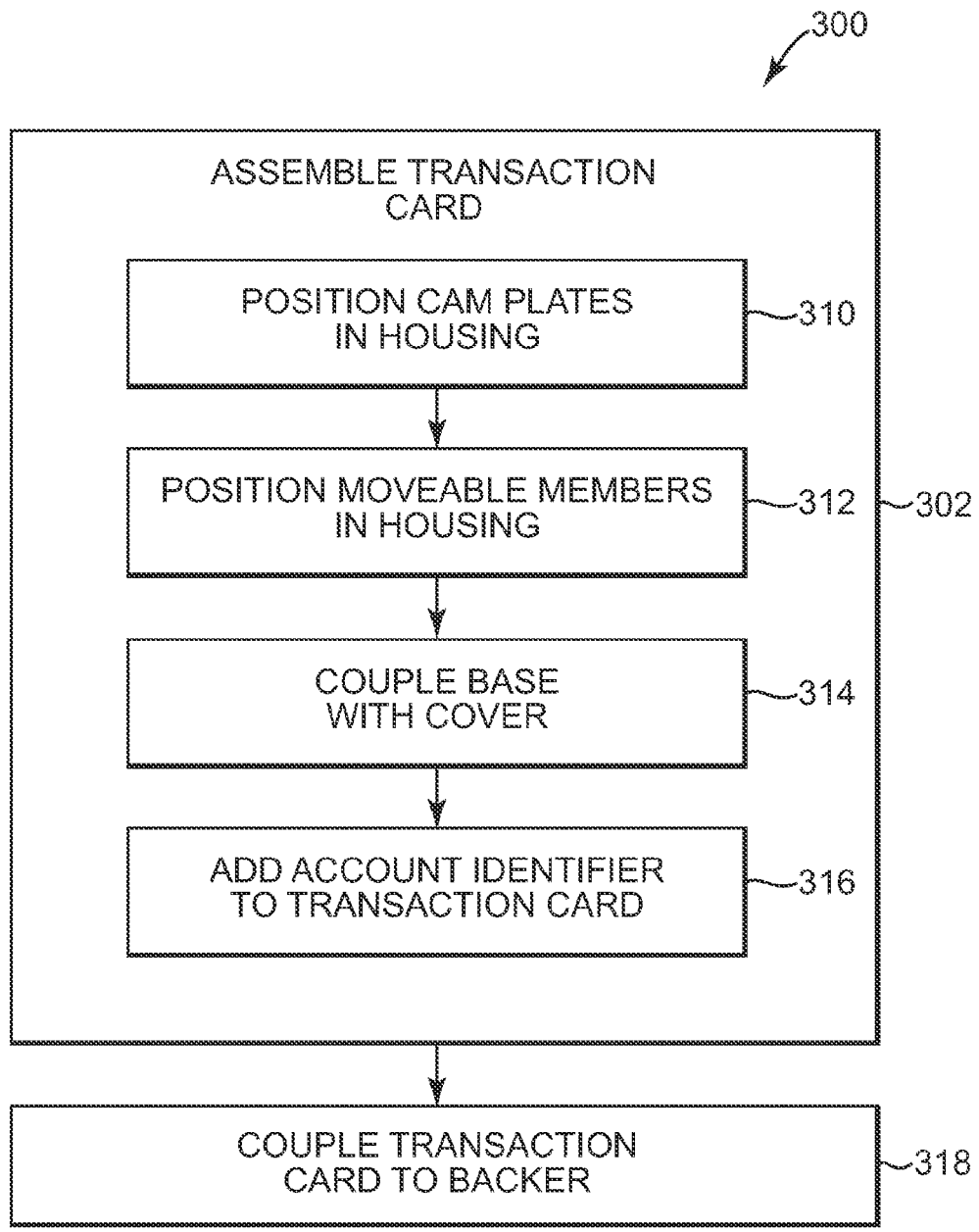
FIG. 13 is a flow chart illustrating a method of assembling the transaction card of FIG. 1, according to one embodiment of the invention.

Redemption indicia 210, which are generally indicated with a dashed box in FIG. 13, indicate that transaction card 10 is redeemable for the purchase of goods and/or services and that upon use, a value of the purchased goods and/or services will be deducted from the account or record linked to transaction card 10. In one embodiment, redemption indicia 210 include phrases such as "<NAME OF STORE> GiftCard" and "This GiftCard is redeemable for merchandise or services at any of our stores or at our website," and/or provides help or phone line information in case of a lost, stolen or damaged transaction card 10, etc.

Instructional indicia 212, which are generally indicated with a broken line box in FIG. 11, include any indications generally referring to how transaction card 10 can be used for entertainment or functional purposes other than value redemption. For example, instructional indicia 212 indicate that spinning dials 170 will change the overall image as viewed by the card bearer through window 118. In one example, one or both of instructional indicia 212 (FIG. 4) and instructional indicia 212 are included anywhere on transaction card assembly 206. Other instructional indicia 212 are also contemplated.

Message field indicia 214, for example, include "to," "from" and "amount" fields are configured to be written to by the bearer of transaction card assembly 206 prior to presenting transaction card assembly 206 to a recipient. As such, message field indicia 214 facilitate the consumer in preparing transaction card assembly 206 for gifting to a recipient. Brand indicia 216 identify a store, brand, department, etc. and/or services associated with transaction card 10 and may additionally or alternatively included on transaction card 10.

Any suitable decorative indicia 218 may also be included on backer 200. In one embodiment, decorative indicia 218 are similar to or otherwise coordinate with any demarcations on transaction card 10. Any of indicia 210, 212, 214, 216, 218 or other indicia optionally may appear anywhere on backer 200 or transaction card 10. Additional information besides that specifically described and illustrated herein may also be included.

In one embodiment, backer 200 defines a window or opening 220 for displaying account identifier 20 of transaction card 10 as illustrated in FIG. 12. As previously described, account identifier 20 is adapted for accessing an account or record associated with transaction card 10 for activating, loading or debiting value from the account or record. Accordingly, in one embodiment, opening 220 allows access to account identifier 20 to activate and/or load transaction card 10 without removing transaction card 10 from backer 200. In one embodiment, backer 200 is configured to receive transaction card 10 such that account identifier 20 is otherwise accessible, for example, by folding back a portion of backer 200, by hanging a portion of transaction card 10 over an edge of backer 200, through a solid portion of backer 200, etc., rather than through opening 220.

In one embodiment, backer 200 defines a hanging aperture 222 configured to receive a support arm or hook, such that transaction card assembly 206 can be hung from a rail or rack within the retail setting or elsewhere to facilitate display of transaction card assembly 206. According to one embodiment, FIG. 12 illustrates surfaces of backer 200 that will be supported on a rack or other fixture while FIG. 11 illustrates surfaces of backer 200 that will be visible to a consumer of a retail store who is considering the purchase of transaction card assembly 206.

In one embodiment, backer 200 is configured to be folded about transaction card 10 to wrap transaction card 10 for presentation to a recipient. For example, in one embodiment, backer 200 includes fold lines 230 and 232, which extend substantially parallel to and are longitudinally spaced from one another to define a first panel 234, a second panel 236 and a third panel 238 of backer 200. For example, second panel 236 extends between first panel 234 and third panel 238. First panel 234 and second panel 236 are divided by fold lines 230, and second panel 236 and third panel 238 are divided by fold lines 232. In one embodiment, transaction card 10 is secured to second panel 236 such that, upon folding backer 200 about fold lines 230 and 232, first panel 234 and third panel 238 are folded relative to second panel 236 to at least partially overlap one another and to substantially enclose transaction card 10 within folded backer 200.

In one embodiment, backer 200 defines a tab 240 and a corresponding slit 242. More specifically, one of first panel 234 and third panel 238 defines one of tab 240 and slit 242, and the other of first panel 234 and third panel 238 defines the other of tab 240 and slit 242. In this configuration, when backer 200 is folded about fold lines 230 and 232, slit 242 receives tab 240 to selectively hold backer 200 in a folded or closed configuration. Other methods of folding backer 200 and/or maintaining backer 200 in a folded configuration will be apparent to those of skill in the art upon reading this application. In one embodiment, a non-foldable backer may be used as an alternative to or in addition to backer 200.

FIG. 13 is a flow chart illustrating one embodiment of a method 300 of assembling transaction card 10. For example, at 310, cam plates 180 are placed within housing 12, more particularly, in one example, are initially placed in base 24 outside of longitudinal flange segments 126. Cam plates 180 are secured to base 24 in any suitable manner, for example, with connection devices 194 as described above. At 312, members 14 are placed within base 24 such that adjacent members have alternating orientations regarding which end 152 or 154 thereof is placed on a right or left side of base 24. Axle portions 158 and 160 associated with member 14 rest within two laterally opposite cutouts 60 defined by flange 50 in a manner supporting member 14 away from primary panel 30 while still allowing rotation of member 14 therein. In one embodiment, placement of member 14 within base 24 places first axle portion 158 to rest on front surface 182 of one of cam plates 180 and places dials 170 to fit within corresponding wells 186 defined by cam plates 180.

Once at least members 14 and, in one embodiment, cam plates 180 are in place, base 24 and cover 26 are coupled to one another. In one instance, inside edge 40 of base 24 is positioned to abut and be secured to inside edge 110 of cover 26 as described above. Other methods of coupling base 24 and cover 26 are also contemplated as are alternative housings 12 that may not include base 24 and/or cover 26.

At 316, account identifier 20 is added to housing 12. Although pictured in FIG. 13 as occurring after all of operations 310, 312 and 314 in FIG. 13, it should be understood that account identifier 20 may be applied to housing 12 or any portion thereof at any suitable time during manufacturing and assembly thereof. For example, account identifier 20 may be molded into or otherwise integrally formed as part of housing 12, may be enclosed within housing 12 and/or may be printed or otherwise applied to housing 12 before or after one or more of operations 310, 312 and 314 as will be apparent to those of skill in the art upon reading this application.

At 318, transaction card 10 is coupled with backer 200 as generally illustrated with additional reference to FIGS. 11 and 12 to form transaction card assembly 206. Transaction card 10 may be adhered, skinned to, blister packed with or otherwise suitable coupled with backer 200. In one embodiment, account identifier 20 of transaction card 10 is accessible for scanning while transaction card 10 is coupled with backer 200.

Figure 14:
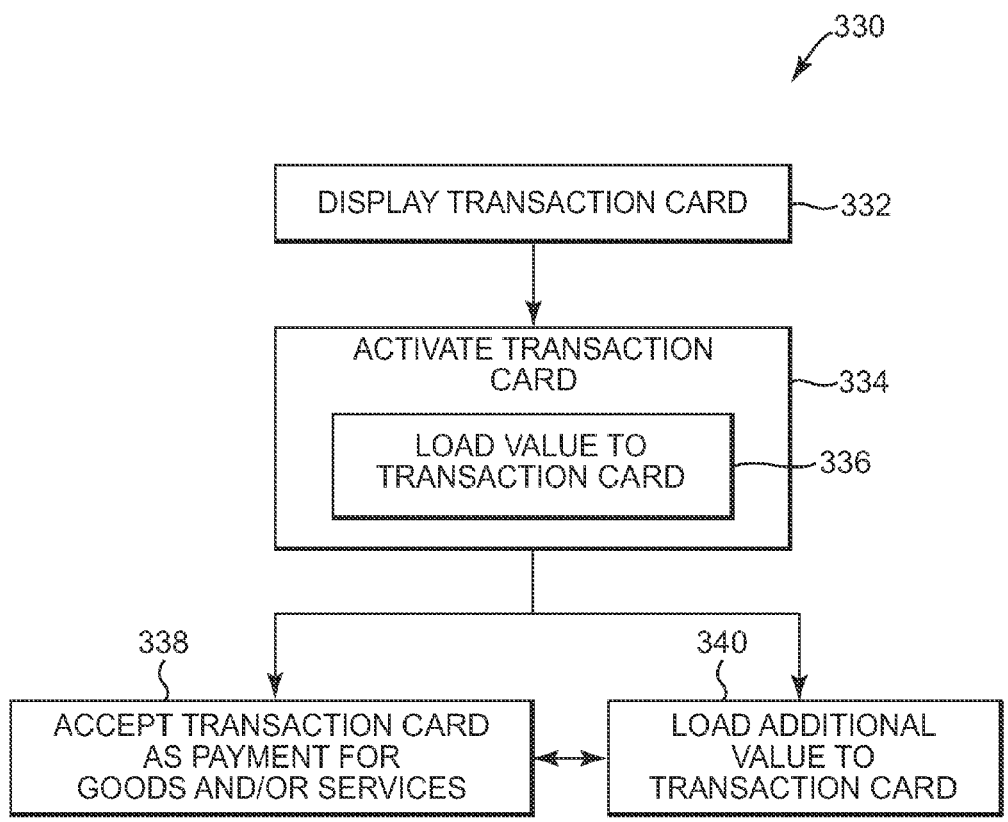
FIG. 14 is a flow chart illustrating a method of encouraging purchase and facilitating use of a transaction card, according to one embodiment the present invention.

FIG. 14 is a flow chart illustrating one embodiment of a method 330 of encouraging purchase and facilitating use of transaction card 10 by consumers and/or recipients. At 332, transaction card 10 is placed on or hung from a rack, shelf or other similar device to display transaction card 10 for sale to potential consumers. For example, additionally referring to FIGS. 11 and 12, backer 200 may be hung from a display rack using aperture 222 such that transaction card 10 is readily visible to potential consumers. In one embodiment, a depiction of transaction card 10 is placed on a web site for viewing and purchase by potential consumers. In one example, display of transaction card 10 includes advertising the record and playback features (i.e., the ability of transaction card 10 to record, play and/or transform an audio file) of the transaction card 10 to encourage consumer purchase of transaction card 10, for example in the forms of indicia 210, 212, 218, etc.

At 334, a consumer who has decided to purchase transaction card 10 presents transaction card 10 on backer 200 to a retail store employee, retail store kiosk, remote terminal or other person or device to scan account identifier 20 to access an account or record linked to account identifier 20. In particular, account identifier 20 is scanned or otherwise accessed, for example through opening 220 of backer 200 to activate transaction card 10. Upon accessing the account or record, then, at 336, value is added to the account or record in the form of monetary value, points, minutes, etc. Thus, transaction card 10 is activated and loaded.

In one example, a predetermined value is associated with transaction card 10 (i.e., associated with the account or record linked to transaction card 10 via account identifier 20) prior to activation and display, but such predetermined value is not initially available for use toward the purchase or use of goods and/or services. In such an embodiment, at 334, transaction card 10 is activated to permit subsequent access to the predetermined value (e.g., subsequent loading on and debiting from the account or record) and no additional value is added during activation such that operation 336 may be eliminated.

Once transaction card 10 is activated and loaded, transaction card 10 can be used by the consumer or any other bearer of transaction card 10 to purchase goods and/or services at the affiliated retail setting (e.g., a retail store or web site) or can be used in exchange for calling minutes, etc. In one embodiment, where transaction card 10 is displayed on a web site at 332, then, at 334, transaction card 10 may be activated in any suitable method and may not require the physical scanning of account identifier 20 to be activated or to otherwise access the associated account or record such as at 336.

In one example, at 338, the retail store or other affiliated retail setting or web site accepts transaction card 10 as payment towards the purchase of goods and/or services made by the current bearer of transaction card 10. In particular, the value currently loaded on transaction card 10 (i.e., stored or recorded in the account or record linked to account identifier 20) is applied toward the purchase of goods and/or services. At 340, additional value is optionally loaded on transaction card 10 at a point-of-sale terminal, kiosk or other area of the retail store, retail web site, or other related setting. Upon accepting transaction card 10 as payment at 338, the retail store or related setting can subsequently perform either operation 338 again or operation 340 as requested by a current bearer of transaction card 10. Similarly, upon loading additional value on transaction card 10 at 340, the retail store or related setting can subsequently perform either operation 340 again or operation 338. In one example, the ability to accept transaction card 10 as payments for goods and/or services is limited by whether the account or record associated with transaction card 10 has any value stored or recorded therein at the time of attempted redemption.

Figure 15:
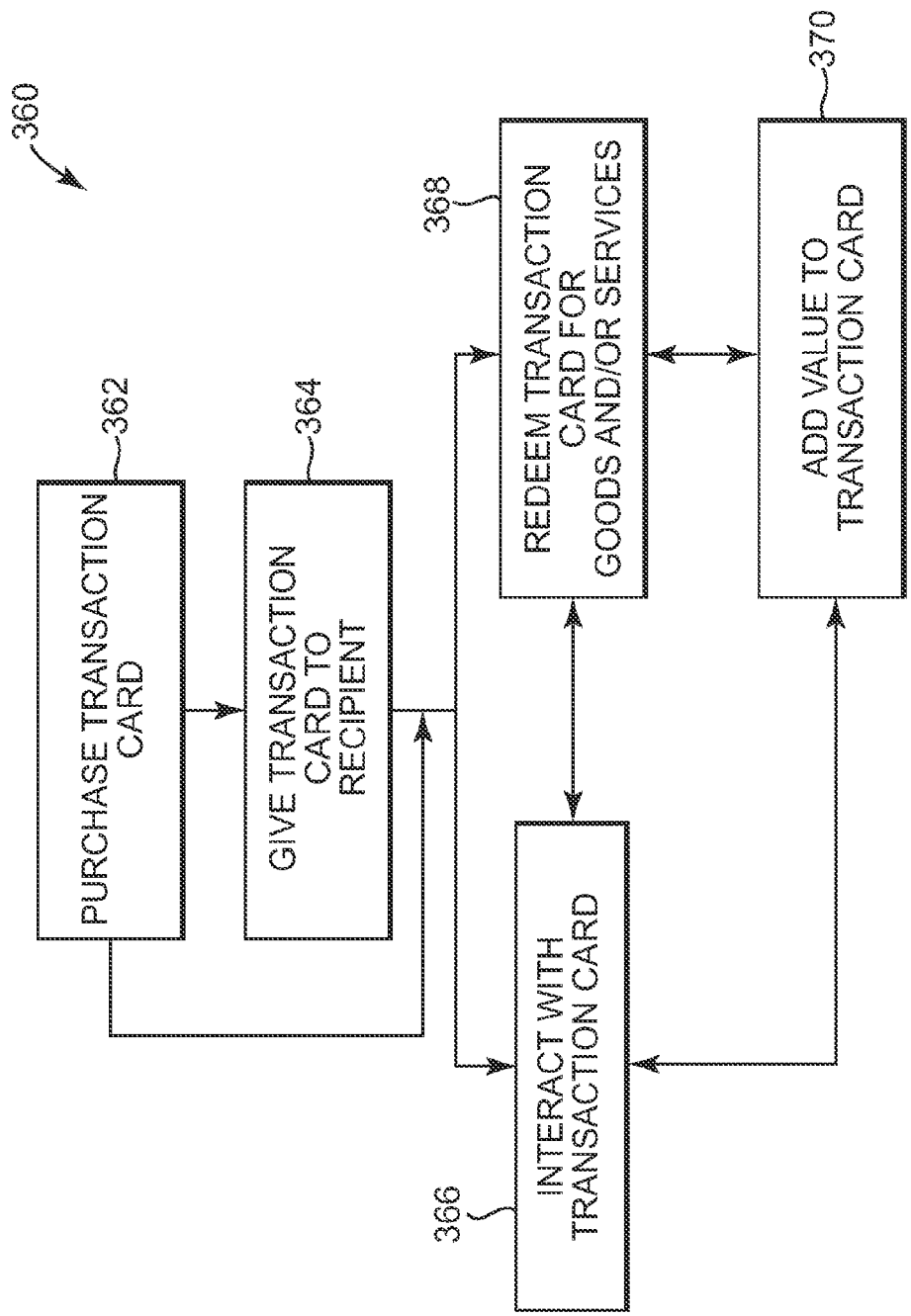
FIG. 15 is a flow chart illustrating a method of using a transaction card, according to one embodiment of the present invention.

FIG. 15 is a flow chart illustrating one embodiment of a method 360 of using transaction card 10 (e.g., FIGS. 1-7). At 362, a potential consumer of transaction card 10, which is displayed in a retail store or viewed on a web site, decides to and does purchase transaction card 10 from the retail store or web site. It should be understood that transaction card 10 can be displayed and purchased alone or as part of transaction product assembly 206 (FIG. 12) along with backer 200. Upon purchasing transaction card 10, a retail store employee, a retail store kiosk or other person or device scans account identifier 20 (FIGS. 4 and 12) through opening 220 of backer 200 or otherwise reads or accesses account identifier 20. Upon accessing account identifier 20, the account or record linked to account identifier 20 is accessed and activated to load value onto transaction card 10 (i.e., load value to the account or record associated with transaction card 10). In one embodiment, such as where transaction card 10 is purchased at 362 via a web site, actual scanning or other mechanical detection of account identifier 20 may be eliminated and/or manual input of code 22 may be added.

At 364, the consumer optionally gives transaction card 10 to a recipient, such as a graduate, relative, friend, expectant parents, one having a recent or impending birthday, a couple having a recent or impending anniversary, etc. In one embodiment, a plurality of transaction cards 10 are purchased and given to party goers, such as at a birthday party, etc. as party favors or gifts. As an alternative, the consumer can keep transaction card 10 for his or her own use thereby eliminating operation 364.

At 366, the consumer, recipient or other current bearer of transaction card 10 interacts with transaction card 10. In one embodiment, playing or otherwise interacting with transaction card 10 at 366 includes interaction with dials 170 to alter the overall image displayed to the card bearer through window 118. More specifically, as described above, rotating or spinning individual dials 170 changes depicted versions 174 of individual portions of the overall image in a manner generally providing amusement to the card bearer and any other observers of transaction card 10.

At 374, the consumer or recipient redeems transaction card 10 for goods and/or services from the retail store or web site. At 376, the consumer or recipient of transaction card 10 optionally adds value to transaction card 10, more particularly, to the account or record associated with account identifier 20 included therewith, at the retail store or over the Internet (i.e., via the web site). Upon playing with transaction card 10 at 366, redeeming transaction card 10 at 374 or adding value to transaction card 10 at 376, the consumer or recipient of transaction card 10 subsequently can perform either of operations 366, 374 or 376 as desired. In one embodiment, the ability of the consumer or recipient to repeat redeeming transaction card 10 at 374 is limited by whether the account or record linked with transaction card 10 has any remaining value stored or recorded therein at the time of attempted redemption.

Although primarily described above as occurring at a single retail store or web site, in one embodiment, purchasing transaction card 10 at 362, redeeming transaction card 10 at 374 and adding value to transaction card 10 at 376, can each be performed at any one of a number of stores adapted to accept transaction card 10 or over the Internet. In one example, a number of stores are each part of a chain or are similarly branded stores. In one example, a number of stores include at least one web site and/or at least one conventional brick and mortar store.

Transaction cards come in many forms, according to embodiments of the invention. The gift card, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance associated with the transaction card declines as the transaction card is used, encouraging repeat visits or use. The transaction card remains in the user's purse or wallet, serving as an advertisement or a reminder to revisit the associated merchant. Gift cards according to embodiments of the invention provide a number of advantages to both the consumer and the merchant. Other gift cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction card comprising:
    a housing;
    a first roller rotatably coupled to and at least partially stored within the housing and having a first rotational axis;
    a second roller rotatably coupled to and at least partially stored within the housing and having a second rotational axis, wherein the second rotational axis differs from the first rotational axis; and
    a machine readable link to an account or record coupled with the housing, the account or record being configured to track an associated value available for application toward one of a purchase and a use of one or more of goods and services.

2. The transaction card of claim 1, wherein the machine readable link is a bar code.

3. The transaction card of claim 1, wherein the machine readable link includes at least one of a bar code, a magnetic strip, a smart chip and a radio frequency identification (RFID) device.

4. The transaction card of claim 1, wherein each of the first roller and the second roller are substantially rigid.

5. The transaction card of claim 1, wherein the first rotational axis and the second rotational axis each extend in a lateral direction and are spaced from one another in a longitudinal direction, the lateral direction and the longitudinal direction being substantially perpendicular to one another.

6. The transaction card of claim 1, wherein the first roller defines a plurality of surfaces each depicting a different version of a first portion of a presented image, such that rotation of the first roller changes which of the plurality of surfaces is viewable by a bearer of the transaction card.

7. The transaction card of claim 6, wherein the first roller is shaped as one of a triangular prism, a rectangular prism, and a pentagonal prism.

8. The transaction card of claim 1, wherein the housing includes a window and the first roller and the second roller are each at least partially viewable through the window, the transaction card further comprising a dial coupled to the first roller, wherein the dial extends at least partially out of the housing at a position spaced from the window.

9. The transaction card of claim 8, wherein the housing defines a substantially planar surface, the substantially planar surface defines the window, and the dial extends at least partially out of the housing through the substantially planar surface.

10. The transaction card of claim 8, wherein the dial is a first dial and the position is a first position, and the transaction card further comprises a second dial coupled to the second roller, wherein the second dial extends at least partially out of the housing at a second position spaced from the window and the first position.

11. The transaction card of claim 10, wherein the first position is located on a first side of the window, and the second position is located on a second side of the window opposite the first side of the window.

12. The transaction card of claim 1, wherein the first roller defines opposing ends, and an axle extends from each of the opposing ends of the first roller, the transaction card further comprising a flange coupled to the housing and defining a plurality of cutouts, and the axle is rotatably received by at least two of the plurality of cutouts.

13. The transaction card of claim 12, wherein the flange is integrally formed as a single piece with the housing.

14. A transaction product assembly comprising:
a support member defining a primary panel with an outside surface, wherein the outside surface is substantially planar;
an auxiliary member defining a rotational axis, wherein the auxiliary member is rotatably maintained by the support member such that the rotational axis is positioned to be parallel to the outside surface, and the auxiliary member is configured to rotate at least a full revolution about the rotational axis; and
an account identifier coupled with the support member and linking the transaction product assembly to an account or record, wherein the account identifier is machine readable.

15. The transaction product assembly of claim 14, wherein the primary panel is sized similarly to a credit card.

16. The transaction product assembly of claim 14, wherein at least a portion of the auxiliary member is substantially enclosed within the housing.

17. The transaction product assembly of claim 16, wherein the primary panel defines an opening revealing at least a second portion of the auxiliary member and an aperture spaced from the opening, the transaction product assembly further comprising a wheel coupled with the auxiliary member and accessible from outside the support member via the aperture such that user interaction with the wheel causes rotation of the auxiliary member.

18. The transaction product assembly of claim 14, wherein the auxiliary member defines a plurality of surfaces each extending parallel to the rotational axis, each of the plurality of surfaces including a different image depiction thereon.

19. A stored-value product comprising:
means for linking the stored-value product with at least one of an account and a record having a value associated therewith such that the stored-value product can be used as payment toward a purchase of one or more of goods and services;
means for depicting an image presentation including:
means for depicting a first portion of the image presentation including a plurality of depicted versions of the first portion, each of the plurality of depicted versions of the first portion differing from other ones of the plurality of depicted versions of the first portion, and
means for depicting a second portion of the image presentation including a plurality of depicted versions of the second portion, each of the plurality of depicted versions of the second portion differing from other ones of the plurality of depicted versions of the second portion;
means for shielding all but one of the plurality of depicted versions of the first portion and all but one of the plurality of depicted versions of the second portion;
means for altering which of the plurality of depicted versions of the first portion is the one of the plurality of depicted versions of the first portion; and
means for altering which of the plurality of depicted versions of the second portion is the one of the plurality of depicted versions of the second portion.

20. The stored-value product of claim 19, wherein the means for altering which of the plurality of depicted versions of the first portion is the one of the plurality of depicted versions of the first portion is separate from the means for altering which of the plurality of depicted versions of the second portion is the one of the plurality of depicted versions of the second portion.

21. The stored-value product of claim 19, wherein the means for depicting a first portion of the image presentation defines a rotational axis and a plurality of surfaces extending in parallel with the rotational axis, and the means for depicting the first portion of the image presentation is configured to rotate at least 360° about the rotational axis.

22. The stored-value product of claim 21, wherein a different one of the plurality of depicted versions of the first portion is included on each of the plurality of surfaces.

23. A method of encouraging purchase and facilitating use of a stored-value card linked to a record or account, the method comprising:
displaying the stored-value card to a potential consumer, wherein the stored-value card includes a support member, a first member rotatable about a first axis extending in a first direction, and a second member rotatable about a second axis extending in the first direction, wherein the first axis is spaced from the second axis in a second direction substantially perpendicular to the first direction, the first member is substantially maintained within the support member, and displaying the stored-value card includes allowing the potential consumer to move each of the first member and the second member about the first axis and the second axis, respectively; and activating the record or account linked to the stored-value card to permit subsequent deductions from a value associated with the record or account for application toward one of a purchase and a use of one or more of goods and services.

24. The method of claim 23, wherein the first member defines a plurality of surfaces extending in parallel with the first axis and each of the plurality of surfaces defines a different one of a plurality of image depictions such that when the potential consumer moves the first member, the potential consumer is able to view different ones of the plurality of image depictions.

25. The method of claim 24, wherein each of the plurality of image depictions is a portion of an overall image presentation provided by the stored-value card to the potential consumer.

* * * * *